US006508656B2

(12) United States Patent
Chevassus-More et al.

(10) Patent No.: US 6,508,656 B2
(45) Date of Patent: Jan. 21, 2003

(54) MULTIPLE PIN CONTACTOR DEVICE FOR POWER BUS BAR SYSTEMS

(75) Inventors: Alain Chevassus-More, Touillon et Loutelet (FR); Christian Pernot, Pontarlier (FR)

(73) Assignee: Framatome Connectors International, Courbevoie (FR)

( * ) Notice: Subject to any disclaimer, the term of this patent is extended or adjusted under 35 U.S.C. 154(b) by 26 days.

(21) Appl. No.: 09/864,006

(22) Filed: May 23, 2001

(65) Prior Publication Data

US 2002/0004328 A1 Jan. 10, 2002

(30) Foreign Application Priority Data

May 24, 2000 (FR) ............................................ 00 06800

(51) Int. Cl.$^7$ ................................................ H01R 4/60
(52) U.S. Cl. ...................... 439/212; 439/857; 439/721; 439/723; 439/709
(58) Field of Search ................................ 439/212, 721, 439/723, 709, 856, 857

(56) References Cited

U.S. PATENT DOCUMENTS 4,845,589 A 7/1989 Weidler et al. ............. 361/342
5,052,953 A * 10/1991 Weber ........................ 439/857

FOREIGN PATENT DOCUMENTS

DE 19833781 A1 2/1999

* cited by examiner

Primary Examiner—Tho D. Ta
(74) Attorney, Agent, or Firm—Perman & Green, LLP

(57) ABSTRACT

The multiple pin contactor device for bus bar systems includes at least one bus bar (3) consisting of at least two plates (1) stacked on top of and fixed to one another. This device includes at least one set of contactor pin forks (5) which coincide and are arranged one above the other, in which the contactor pin forks (5) of the different plates (1) are movable independently of one another when the plug-in contactor (10) is introduced.

10 Claims, 4 Drawing Sheets

MULTIPLE PIN CONTACTOR DEVICE FOR POWER BUS BAR SYSTEMS

BACKGROUND OF THE INVENTION

1. Field of the Invention

The present invention concerns a multiple pin contactor device for power bus bar systems, which comprises at least one bus bar rail consisting of at least two plates stacked on top of and fixed to one another.

2. Description of Prior Developments

Such bus bar rails find application in various systems such as systems of the supply of electricity to industrial installations where high-intensity currents of the order of 500 Amps and over have to be distributed, or of the supply of current to domestic installations where currents of the order of 10 Amps have to be distributed at a potential of 200 or 380 Volts. In such distribution systems, it is appropriate and at the same time problematical, to distribute the current by means of the connection of contactor plugs and connectors between the principal bus bar and the users, or other bus bars. Problems can arise with the resistance of the plug-in contactor, which may in time rise significantly, if, for example, by reason of the crushing of the connector studs in the socket, the area of contact is reduced and that accordingly local overheating and hence possible points of corrosion occur on the plug-in connectors. The contactor resistance then falls until a complete breakdown occurs.

SUMMARY OF THE INVENTION

The present invention has the object of providing a multiple pin contactor device for power bus bar systems, which seeks to ensure that the area of contact between the elements which can be plugged into one another, is always adequately large for the contact resistance of the plug-in connector not to rise excessively.

This object is reached by means of a multiple pin contactor device for bus bar systems comprising at least one bus bar consisting of at least two plates stacked on top of and fixed to one another and comprising at least one set of contactor pin forks which coincide and are arranged, one above the other, in which the contactor pin forks of the different plates are able to move independently of one another, when a plug-in contactor is introduced.

Generally speaking, the idea behind the invention is that of assembling the multiple pin contactors from numerous plates fitted with contactors whose contactor pin forks are able to move independently of one another and which separately exert a pressure on the plug-in connector when it is inserted.

Preferably, the contactor pin forks have parallel columns, each of which exhibits a bulge at the front end, which reduces the gap between them and widens the plug-in side into the form of a funnel.

According to one variant, the invention finds application in an installation comprising several bus bars fixed parallel to one another on a support and comprising a current distribution assembly such that in each case a contactor pin fork unit is arranged in protection housings embedded in the support. The protection housings of each contactor pin fork each have a lodgement separated from the rest by movable partitions.

BRIEF DESCRIPTION OF THE DRAWINGS

The invention shall be explained in detail below, with the help of the description of an embodiment example, taking into account the Figures. These show the following.

DESCRIPTION OF THE PREFERRED EMBODIMENT

Figure 1:
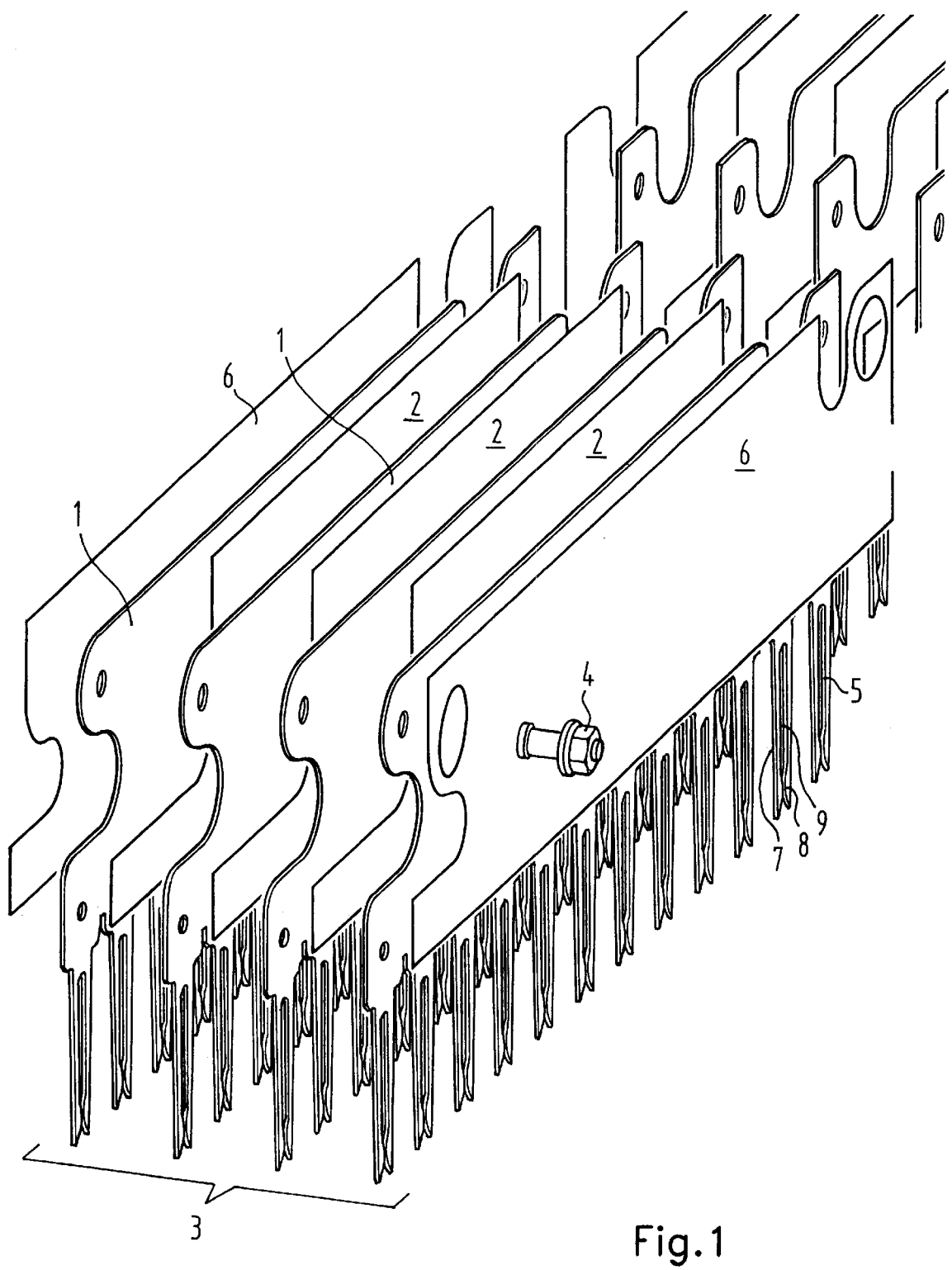
FIG. 1 a power bus bar according to the invention, with several conducting plates, prior to assembly FIG. 2 a perspective view of the multiple pin contactor device according to the invention.

In FIG. 1 can be seen four plates 1, which are fixed to one another by pressure, using adhesive sheets coated with adhesive on both sides 2 and which together form a bus bar 3. The glued lamination consisting of plates 1 and adhesive sheets 2 is finally fixed by at least one screw 4 in a zone where the adhesive sheets 2 are recessed, so that the bus bar metal plates in the recessed zones are in direct electrical contact with one another.

FIG. 1 moreover shows that all the plates 1 have, on their lower longitudinal side, pin contactor forks 5, which are, for example, cut in each plate and which in all cases are arranged in such a way that the connections of the contactors arranged at the same height on the assembled bus bar, are aligned.

Figure 2:
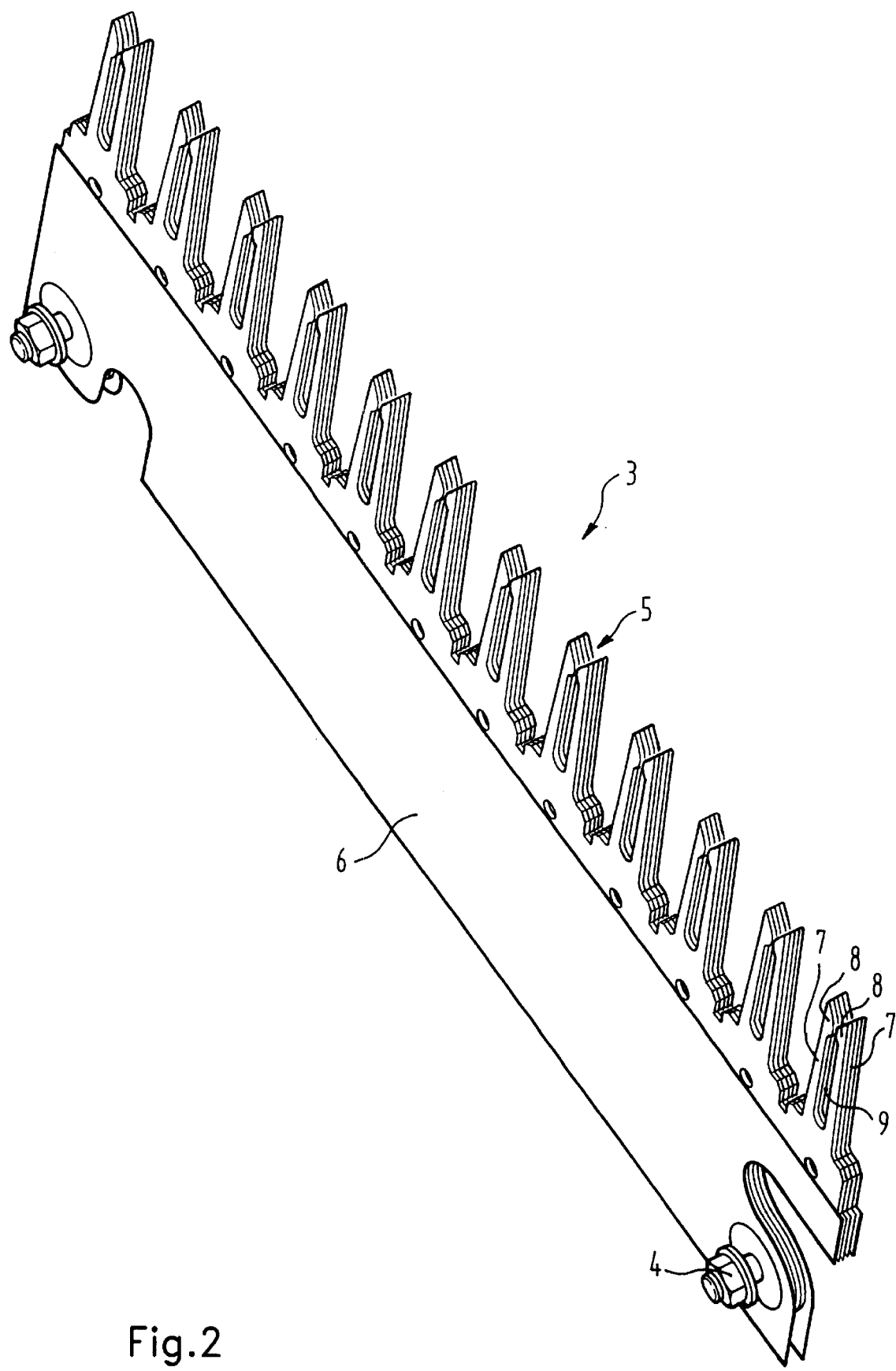

FIG. 2 shows a completely assembled bus bar 3, whose surfaces are covered on both sides, except on the contactor pin forks, by an insulating sheet 6.

Figure 4:
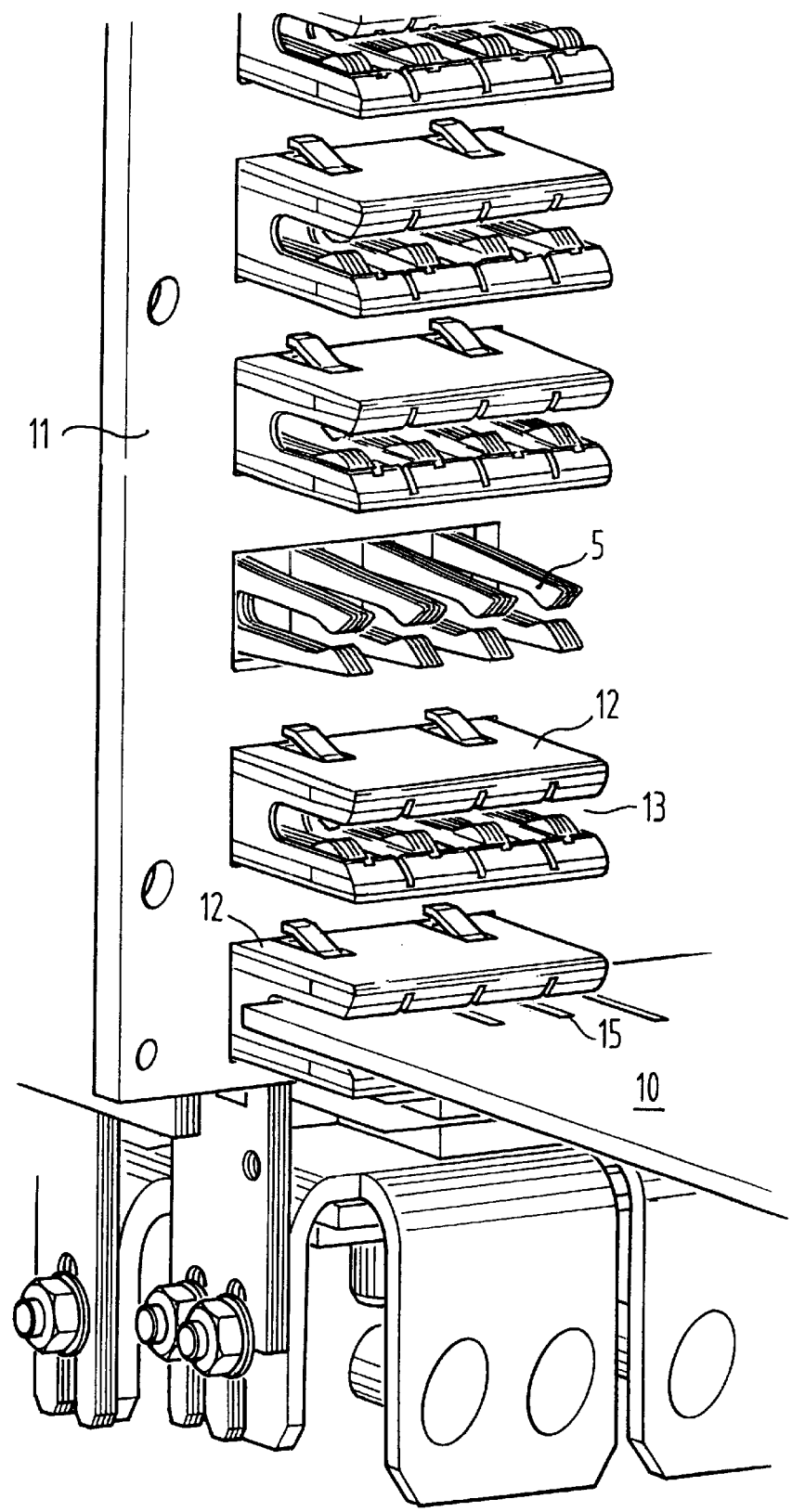
FIG. 4 the multiple pin contactor device according to the invention, assembled in a current distribution installation.

The contactor pin forks have two parallel columns 7 each, which comprise on the plug-in end a bulge 8, which makes it possible for the gap 9 between the two columns 7 to narrow, in order to open up in the shape of a funnel on the plug-in side, in order to facilitate the introduction of a plug-in contactor 10 shown in FIG. 4.

The plates and the contactor pin forks which are attached thereto, made in one piece, are made of a very elastic metal or metal alloy which is also a good electrical conductor, such as, for example, bronze, Cu 75 or the like.

Several bus bars 3 such as those shown in FIG. 2 in an application shown in FIG. 4 are arranged side-by-side and parallel with one another in a distribution housing 11 as a system of current distribution. Windows are cut in a partition of the distribution housing, from which in each case emerges a set of contactor pin forks 5.

Figure 3:
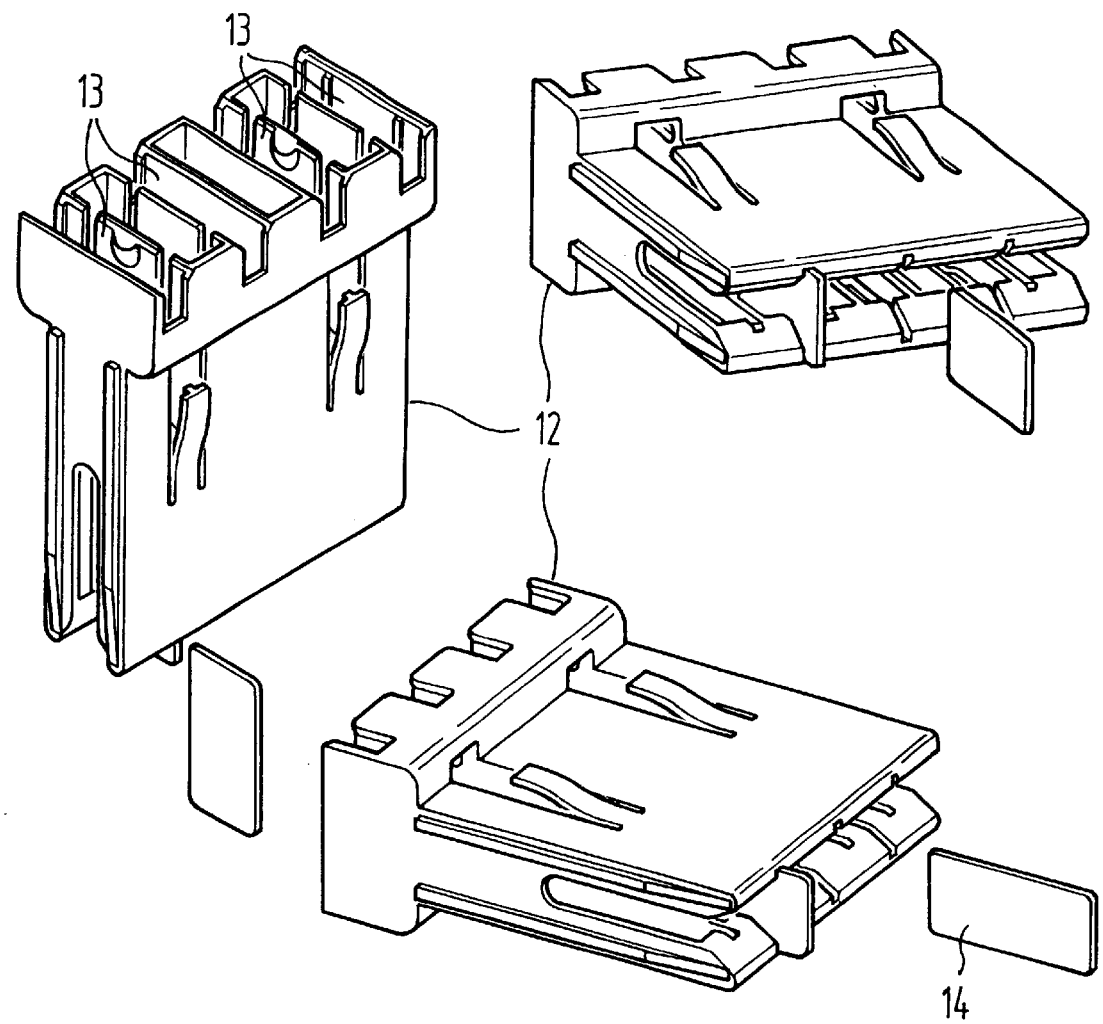
FIG. 3 perspective views of a protection housing of a set of multiple pin contactor cables.

In order to protect the contactor pin forks and to prevent the voltage peaks, which may occur between the contactor pin forks of the different conducting plates, protection housings 12 have also been provided. These housings, which can be seen in FIG. 3, are linked to the partition of the distribution housing 11. In these housings, each contactor pin fork 5 is lodged in a separate cavity 13. The said cavities 13 are, moreover, separated between the contactor pin forks 5 by movable separation partitions 14, in order to prevent the occurrence of voltage peaks.

FIG. 4 shows a portion of the current distribution device in which can be seen inserted, in the lowermost multiple contactor device, a plug-in contactor 10. The latter has grooves 15 and is thus divided into several plug-in contactors in the zone of introduction. The differences of coplanarity of the said ends of the plug-in contactors, are compensated by the columns of the contactor pin forks 5, which are independent and completely movable with respect to one another and the passage of optimum current is ensured on the plug-in contactor 10 of each bus bar.

The foregoing description of an embodiment example is not a limiting one, but merely serves to illustrate the present invention.

We claim:

1. A multiple pin contactor device for bus bar systems, the contactor device comprising at least one bus bar consisting of at least two metal plates stacked on top of and fixed to one another, wherein the device comprises at least one set of contactor pin forks which coincide and are arranged one above the other, such that the contactor pin forks of the different plates are movable independently of one another and which separately exert pressure on a plug-in connector when a plug-in is introduced, each set of contactor pin forks being arranged in a separate housing, each housing being physically separated from each other.

2. A multiple pin contactor device according to claim 1, wherein said plates are screwed to one another.

3. A multiple pin contactor device according to claim 1, wherein said contactor pin forks have parallel columns each comprising a bulge at a front end, which reduces a gap between them and widens in the form of a funnel on a plug-in side.

4. A multiple pin contactor device according to claim 1, wherein said plates are made of bronze, Cu 75 or another very elastic metal or metal alloy.

5. A multiple pin contactor device according to claim 1, wherein of said contactor pin forks are arranged one side of the bus bar.

6. A multiple pin contactor device according to claim 1, characterised by the fact that the stacked plates are fixed to one another by means of adhesive sheets coated with adhesive on both sides.

7. A multiple pin contactor device according to claim 2, characterised by the fact that the adhesive sheets (2) are smaller than the plates (1) and leave the contactor pin forks free.

8. A multiple pin contactor device according to claim 5, wherein several bus bars are fixed parallel to one another on a support which defines a current distribution assembly, such that in each case a unit of said contactor pin forks is arranged in protection housings embedded in said support.

9. A multiple pin contactor device according to claim 8, wherein said protection housings of each of said contactor pin forks has a lodgment which is separated by movable partitions.

10. A multiple pin contactor device according to claim 8, wherein each bus bar is designed for currents of up to 150 Ams and that said protection housings make possible voltages of the order of 500 Volts.

* * * * *

UNITED STATES PATENT AND TRADEMARK OFFICE
CERTIFICATE OF CORRECTION

PATENT NO. : 6,508,656 B2
DATED : January 21, 2003
INVENTOR(S) : Chevassus-More et al.

It is certified that error appears in the above-identified patent and that said Letters Patent is hereby corrected as shown below:

<u>Column 4,</u>
Line 5, "claim 2" should read -- claim 6 --.

Signed and Sealed this

Nineteenth Day of August, 2003

JAMES E. ROGAN
*Director of the United States Patent and Trademark Office*